US010926493B2

United States Patent
Roberts et al.

(10) Patent No.: US 10,926,493 B2
(45) Date of Patent: Feb. 23, 2021

(54) METHODS FOR LIQUID RESIN INFUSION

(71) Applicant: The Boeing Company, Chicago, IL (US)

(72) Inventors: Richard W. Roberts, Deer Park (AU); Kursat Sezai, Moonee Ponds (AU)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 15/833,604

(22) Filed: Dec. 6, 2017

(65) Prior Publication Data
US 2019/0168466 A1  Jun. 6, 2019

(51) Int. Cl.
*B29C 70/44* (2006.01)
*B29C 70/54* (2006.01)

(52) U.S. Cl.
CPC .......... *B29C 70/443* (2013.01); *B29C 70/546* (2013.01); *B29C 70/547* (2013.01)

(58) Field of Classification Search
CPC .................................................... B29C 70/443
See application file for complete search history.

(56) References Cited

U.S. PATENT DOCUMENTS

| | | | |
|---|---|---|---|
| 8,066,503 B2 | 11/2011 | Hawkins et al. | |
| 8,480,393 B2* | 7/2013 | Miller | B29C 70/443 425/447 |
| 2007/0063393 A1 | 3/2007 | Vernin et al. | |
| 2011/0169190 A1* | 7/2011 | Miller | B29C 70/443 264/257 |
| 2014/0106100 A1* | 4/2014 | Weirather | B29C 70/08 428/36.1 |
| 2018/0297300 A1* | 10/2018 | Tokutomi | B29C 70/443 |

FOREIGN PATENT DOCUMENTS

| | | |
|---|---|---|
| EP | 2451808 | 5/2012 |
| EP | 3266595 | 1/2018 |
| WO | 2012026980 | 3/2012 |
| WO | 2012027544 | 3/2012 |

OTHER PUBLICATIONS

Combined Search and Examination Report for British Patent Application No. GB1819888.7 dated May 24, 2019.
Combined Search and Examination Report for British Patent Application No. GB2002914.6 dated Aug. 21, 2020.

* cited by examiner

*Primary Examiner* — Xiao S Zhao
*Assistant Examiner* — Nicholas J Chidiac
(74) *Attorney, Agent, or Firm* — Kunzler Bean & Adamson

(57) ABSTRACT

A method of infusing liquid resin into a sheet of fibrous material comprises evacuating gaseous contaminants from the sheet of fibrous material through a permeable media layer to an outlet and comprises flowing liquid resin from an inlet through the permeable media layer. The method further comprises infusing the liquid resin into the sheet of fibrous material and selectively adjusting a distance between the non-permeable bladder and the fibrous material at a gap, formed in the permeable media layer, such that a first resistance to fluid flow through the permeable media layer is reduced.

20 Claims, 7 Drawing Sheets

METHODS FOR LIQUID RESIN INFUSION

FIELD

This disclosure relates generally to manufacturing parts made of fiber-reinforced polymers, and more particularly to liquid resin infusion processes and systems associated with the manufacturing of such parts.

BACKGROUND

Some parts made from fiber-reinforced polymers are manufactured using a liquid resin infusion process. Liquid resin infusion includes infusing liquid resin into a "dry" sheet of fibrous material. Often, a choke is employed to restrict flow of the liquid resin and help distribute the liquid resin in the sheet. Some liquid resin infusion techniques include drying the sheet, to evacuate gaseous volatiles from the sheet, before infusing liquid resin into the sheet. However, efficiently evacuating gaseous volatiles from the sheet and efficiently infusing liquid resin into the sheet can be difficult due to the choke.

SUMMARY

The subject matter of the present application has been developed in response to the present state of the art, and in particular, in response to shortcomings of conventional liquid resin infusion processes and systems. Accordingly, the subject matter of the present application provides a system, with a permeability control valve, and associated methods that overcome at least some of the above-discussed shortcomings of conventional processes and systems.

Described herein is a system for infusing liquid resin into a sheet of fibrous material. The system comprises a tool. The system also comprises a permeable media layer. The tool and the permeable media layer are configured to have the sheet therebetween. The system further comprises a non-permeable bladder configured to be sealed to the tool about the sheet of fibrous material and the permeable media layer such that, when the sheet of fibrous material is between the tool and the permeable media layer, the sheet of fibrous material and the permeable media layer are sealed between the non-permeable bladder and the tool. The system additionally comprises an inlet selectively fluidly coupleable with the permeable media layer to deliver liquid resin to the permeable media layer. The system also comprises an outlet selectively fluidly coupleable with the permeable media layer to create a pressure differential across the non-permeable bladder. The system further comprises a permeability control valve selectively operable to adjust the permeability of the permeable media layer. The preceding subject matter of this paragraph characterizes example 1 of the present disclosure.

The system further comprises a gap formed in the permeable media layer, wherein the permeability control valve is selectively operable to plug the gap to reduce the permeability of the permeable media layer, by urging the non-permeable bladder into the gap, and unplug the gap to increase the permeability of the permeable media layer, by urging the non-permeable bladder out of the gap. The preceding subject matter of this paragraph characterizes example 2 of the present disclosure, wherein example 2 also includes the subject matter according to example 1, above.

The permeability control valve comprises a rigid cap sealed to the non-permeable bladder over the gap. The preceding subject matter of this paragraph characterizes example 3 of the present disclosure, wherein example 3 also includes the subject matter according to example 2, above.

The rigid cap defines an interior cavity between the rigid cap and the non-permeable bladder. The permeability control valve further comprises a first vacuum fluidly coupleable with the rigid cap and selectively operable to reduce a first pressure in the interior cavity to below atmospheric pressure to allow the non-permeable bladder to move out of the gap. The preceding subject matter of this paragraph characterizes example 4 of the present disclosure, wherein example 4 also includes the subject matter according to example 3, above.

The system further comprises a vent fluidly coupled with the rigid cap and selectively operable to vent the interior cavity to the atmosphere to plug the gap. The preceding subject matter of this paragraph characterizes example 5 of the present disclosure, wherein example 5 also includes the subject matter according to example 4, above.

The system further comprises a resin source configured to contain the liquid resin and fluidly coupleable with the inlet to deliver the liquid resin to the inlet. The system also comprises a second vacuum fluidly coupleable with the resin source to adjust a second pressure (P2) applied to the liquid resin in the resin source. The system additionally comprises a third vacuum fluidly coupleable with the outlet to adjust a third pressure (P3) at the outlet. The preceding subject matter of this paragraph characterizes example 6 of the present disclosure, wherein example 6 also includes the subject matter according to any one of the examples 4 or 5, above.

The system is operable in one of a first mode, a second mode, or a third mode. In the first mode, the first pressure is approximately zero millibar, the second pressure is approximately zero millibar, and the third pressure is approximately zero millibar. In the second mode, the first pressure is atmospheric pressure, the second pressure is greater than zero millibar and less than atmospheric pressure, and the third pressure is approximately zero millibar. In the third mode, the first pressure is approximately zero millibar, the second pressure is greater than zero millibar and less than atmospheric pressure, and the third pressure is approximately zero millibar. The preceding subject matter of this paragraph characterizes example 7 of the present disclosure, wherein example 7 also includes the subject matter according to example 6, above.

The system further comprises a controller operably coupled with the first vacuum, the second vacuum, and the third vacuum. The controller is configured to automatically switch operation of the system between the first mode, the second mode, and the third mode. The preceding subject matter of this paragraph characterizes example 8 of the present disclosure, wherein example 6 also includes the subject matter according to example 7, above.

The permeability control valve is adjacent the outlet and between the inlet and the outlet. The preceding subject matter of this paragraph characterizes example 9 of the present disclosure, wherein example 9 also includes the subject matter according to any one of the examples 1-8, above.

The permeability control valve is adjacent the inlet and between the inlet and the outlet. The preceding subject matter of this paragraph characterizes example 10 of the present disclosure, wherein example 10 also includes the subject matter according to any one of the examples 1-9, above.

The permeability control valve is a first permeability control valve adjacent the outlet and between the inlet and the outlet. The system further comprises a second permeability control valve adjacent the inlet and between the inlet and the outlet. The preceding subject matter of this paragraph characterizes example 11 of the present disclosure, wherein example 11 also includes the subject matter according to any one of the examples 1-10, above.

The system further comprises a release film layer configured to be interposed between the sheet of fibrous material and the permeable media layer, when the sheet of fibrous material is between the tool and the permeable media layer, and interposed between the tool and the permeable media layer. The release film layer has a permeability lower than the permeability of the permeable media layer and higher than the permeability of the non-permeable bladder. The system further comprises a second permeability control valve adjacent the inlet and between the inlet and the outlet. The preceding subject matter of this paragraph characterizes example 12 of the present disclosure, wherein example 12 also includes the subject matter according to any one of the examples 1-11, above.

Further described herein is a method of infusing liquid resin into a sheet of fibrous material. The method comprises evacuating gaseous contaminants from a sheet of fibrous material, covered by a non-permeable bladder sealed to a tool about the sheet of fibrous material, through a permeable media layer to an outlet. The method also comprises flowing liquid resin from an inlet through a permeable media layer interposed between the sheet of fibrous material and the non-permeable bladder. The method further comprises infusing the liquid resin into the sheet of fibrous material from the permeable media layer. The method additionally comprises selectively adjusting a permeability of the permeable media layer such that the permeability of the permeable media layer while evacuating the gaseous contaminants is higher than while flowing and infusing the liquid resin. The preceding subject matter of this paragraph characterizes example 13 of the present disclosure.

Selectively adjusting the permeability of the permeable media layer comprises controlling a permeability control valve to deflect the non-permeable bladder into a gap formed in the permeable media layer to lower the permeability of the permeable media layer and controlling the permeability control valve to urge the non-permeable bladder out of the gap formed in the permeable media layer to raise the permeability of the permeable media layer. The preceding subject matter of this paragraph characterizes example 14 of the present disclosure, wherein example 14 also includes the subject matter according to example 13, above.

Deflecting the non-permeable bladder into a gap comprises venting an interior cavity of a rigid cap of the permeability control valve, sealed to the non-permeable bladder over the gap, to the atmosphere while a third pressure at the outlet is less than atmospheric pressure. Urging the non-permeable bladder out of the gap comprises reducing a first pressure in the interior cavity of the rigid cap of the permeability control valve to less than atmospheric pressure while the third pressure at the outlet is more than or equal to the first pressure. The preceding subject matter of this paragraph characterizes example 15 of the present disclosure, wherein example 15 also includes the subject matter according to example 14, above.

The third pressure is approximately zero millibar. The first pressure is approximately zero millibar. The preceding subject matter of this paragraph characterizes example 16 of the present disclosure, wherein example 16 also includes the subject matter according to example 15, above.

Flowing the liquid resin comprises selectively increasing a permeability of the permeable media layer while liquid resin in a resin source, fluidly coupled to the inlet, is at a second pressure and a third pressure at the outlet is less than the second pressure. The preceding subject matter of this paragraph characterizes example 17 of the present disclosure, wherein example 17 also includes the subject matter according to example 13, above.

The second pressure is between about 500 millibar and about 800 millibar. The third pressure is approximately zero millibar. The preceding subject matter of this paragraph characterizes example 18 of the present disclosure, wherein example 18 also includes the subject matter according to example 17, above.

Selectively increasing the permeability of the permeable media layer comprises controlling a permeability control valve to urge the non-permeable bladder out of a gap formed in the permeable media layer. The preceding subject matter of this paragraph characterizes example 19 of the present disclosure, wherein example 19 also includes the subject matter according to any one of the examples 17 or 18, above.

Additionally, described herein is a valve for adjusting a permeability of a permeable media layer. The valve comprises a gap formed in the permeable media layer. The valve also comprises a non-permeable bladder directly adjacent the permeable media layer and traversing the gap of the permeable media layer. The valve further comprises a rigid cap sealed to the non-permeable bladder over the gap. An interior cavity is defined between the rigid cap and the non-permeable bladder. The valve additionally comprises a vacuum fluidly coupleable with the rigid cap and selectively operable to reduce a pressure (P1) in the interior cavity to below atmospheric pressure to urge the non-permeable bladder out of the gap of the permeable media layer. The valve also comprises a vent fluidly coupled with the rigid cap and selectively operable to vent the interior cavity to the atmosphere to urge the non-permeable bladder into the gap of the permeable media layer. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

The present disclosure provides a control valve that is configured to adjust the permeability of a permeable media layer to help facilitate a liquid resin infusion process. Generally, the liquid resin infusion process includes urging liquid resin into a sheet of fibrous material, forming a stack with the permeable media layer, by creating a pressure differential across the stack. The permeability control valve of the present disclosure can be used as an outlet valve to increase the permeability of the permeable media layer and promote evacuation of gases from a sheet of fibrous material before liquid resin is infused into the sheet. Accordingly, the permeability control valve helps to ensure the flow of gases is not choked during an evacuation step. Then, to choke the flow of liquid resin during a resin infusion step, to ensure complete infusion of liquid resin in the sheet, the permeability control valve decreases the permeability of the permeable media layer. Additionally, or alternatively, a permeability control valve of the present disclosure can be used as an inlet valve to increase or decrease the permeability of the permeable media layer where the liquid resin enters the permeable media layer to control the flow of liquid resin into the permeable media layer.

Figure 1:
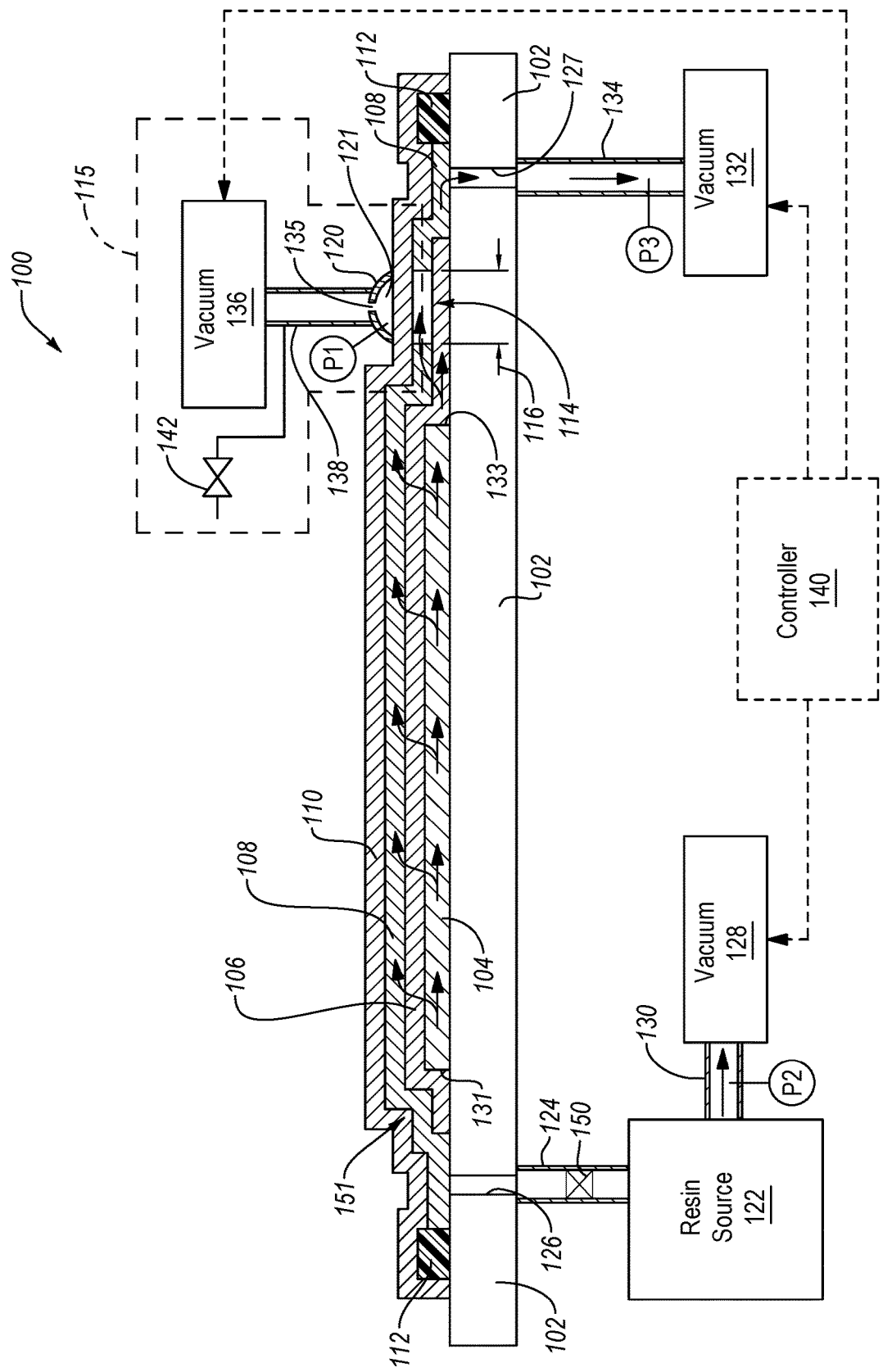
FIG. 1 is a schematic illustration of a system for infusing liquid resin into a sheet of fibrous material, in a first mode, according to one or more examples of the present disclosure.

Referring to FIG. 1, according to one embodiment, a system 100 for infusing liquid resin into a sheet 104 of fibrous material is shown. The system 100 includes a tool 102 on which the sheet 104 is supported during use of the system 100. The sheet 104 can be a single-layer or multi-layer sheet having a thickness substantially less than a length and width. Each layer of the sheet 104 includes fibrous material, which can be defined as reinforcement fibers made from any of various materials, such as carbon, glass, silica, aramid, basalt, and the like. Each of the fibers of the sheet 104 are elongated in a lengthwise direction and have a diameter substantially less than a length. The fibers of each layer may be multi-directional or uni-directional. Prior to infusion of liquid resin into the sheet 104, the sheet 104 is considered a dry composite layup because the sheet 104 is void of epoxy or resin. Often, however, gaseous volatiles, including trapped air and moisture, may be inadvertently introduced into the sheet 104 during the formation and/or handling of the sheet 104. The fibrous material of the sheet 104 collectively defines a shape of the sheet 104, which can be any of various shapes. In one implementation, the sheet 104 is substantially planar or 2-dimensional with a thickness smaller than a width or length of the sheet. According to other implementations, the sheet 104 is substantially non-planar or 3-dimensional.

Generally, the sheet 104 conforms to the shape of the tool 102. In other words, the shape of the sheet 104 when infused with liquid resin corresponds with the shape of the tool 102. In the illustrated embodiment, the tool 102 has a flat support surface that supports the sheet 104 on the tool 102. Accordingly, in the illustrated embodiment, the sheet 104 is substantially planar. However, in other embodiments, the support surface of the tool 102 is not planar (e.g., includes curves and/or protrusions) such that the sheet 104 also is not planar. The tool 102 is rigid. More specifically, the tool 102 is more rigid than the sheet 104, the permeable media layer 108, and the non-permeable bladder 110. In some implementations, the tool 102 is made of a metal or ceramic material.

The system 100 also includes a release film layer 106 applied over the sheet 104 during use of the system 100 such that the sheet 104 is interposed between the release film layer 106 and the tool 102. In one implementation, the release film layer 106 has a surface area larger than that of the sheet 104 such that the release film layer 106 overlays an entirety of the sheet 104 and a portion of the tool 102 around an entire periphery of the sheet 104. In this manner, the sheet 104 is entirely enclosed between the release film layer 106 and the tool 102. In the illustrated embodiment, the release film layer 106 is in direct contact with the sheet 104 and in direct contact with the portion of the tool 102 around the entire periphery of the sheet 104.

In one implementation, the release film layer 106 is flexible and conforms to the shape of the sheet 104 and the tool 102. Furthermore, the release film layer 106 is made of a low-stick material that helps reduce adhesion between the release film layer 106 and the sheet 104 after the sheet 104 is infused with liquid resin and after the infused liquid resin is cured. Additionally, the release film layer 106 is semi-permeable in thickness and plane to allow liquid resin to flow through the release film layer 106 and into the sheet 104. According to some implementations, the release film layer 106 has a permeability between 3,000 millidarcy (md) and 9,000 millidarcy (md). In one implementation, the release film layer 106 is made of a fiberglass fabric coated with polytetrafluoroethylene (PTFE), such as RELEASE EASE 234™ or DAHLAR® made by Airtech International Inc. of Huntington Beach, Calif.

The system 100 further includes a permeable media layer 108 applied over the sheet 104 and the release film layer 106 such that the sheet 104 is interposed between the permeable media layer 108 and the tool 102 and the release film layer 106 is interposed between the permeable media layer 108 and the sheet 104. In one implementation, the permeable media layer 108 has a surface area larger than that of the sheet 104 and larger than that of the release film layer 106 such that the permeable media layer 108 overlays an entirety of the sheet 104, at least a portion of the release film layer 106, and at least a portion of the tool 102 around the entire periphery of the release film layer 106. In the illustrated embodiment, the permeable media layer 108 is in direct contact with the release film layer 106 and in direct contact with the portion of the tool 102 around the entire periphery of the release film layer 106. The low-stick materials of the release film layer 106 help reduce adhesion between the release film layer 106 and the permeable media layer 108. Accordingly, the release film layer 106 allows the permeable media layer 108 to overlay the sheet 104 without sticking to the sheet 104.

In one implementation, the permeable media layer 108 is flexible and conforms to the shape of the release film layer 106 and the tool 102. Moreover, the permeable media layer 108 is permeable in thickness and plane to allow liquid resin to flow through the permeable media layer 108 and into the release film layer 106. The permeability of the permeable media layer 108 is higher than the permeability of the release film layer 106 and higher than the permeability of the sheet 104. According to some implementations, the permeable media layer 108 has a permeability greater than 3,000,000 millidarcy (md). In one implementation, the permeable media layer 108 is a web of interlocking elements, such as a mesh, made of a polymeric material, such as nylon or plastic. In one implementation, the permeable media layer 108 can be made of PLASTINET 15231™ made by Airtech International Inc. of Huntington Beach, Calif.

A gap 116 is formed in the permeable media layer 108. The gap 116 is defined as a space or void in the permeable media layer 108 that entirely divides one portion of the permeable media layer 108 from another. In some implementations, the gap 116 is a through-aperture formed in the permeable media layer 108. The gap 116 is open from one side of the permeable media layer 108 to the opposing side of the permeable media layer 108. The gap 116 can have any of various shapes and sizes. Generally, the gap 116 has a width parallel to the arrows identifying the gap 116. The gap 116 may have a corresponding length perpendicular to the width (e.g., extending into and/or out of the page in FIGS. 1-4). The length can be equal to or substantially greater than the width. For example, the gap 116 can be elongated in the lengthwise direction.

The system 100 further includes a non-permeable bladder 110 applied over the sheet 104, the release film layer 106, and the permeable media layer 108 such that the sheet 104 is interposed between the non-permeable bladder 110 and the tool 102 and the permeable media layer 108 is interposed between the non-permeable bladder 110 and the release film layer 106. In one implementation, the non-permeable bladder 110 has a surface area larger than that of the sheet 104, the release film layer 106, and the permeable media layer 108 such that the non-permeable bladder 110 overlays an entirety of the sheet 104, an entirety of the release film layer 106, an entirety of the permeable media layer 108, and at least a portion of the tool 102 around the entire periphery of the permeable media layer 108. In the illustrated embodiment, the non-permeable bladder 110 is in direct contact with the permeable media layer 108 and in direct or indirect contact with the portion of the tool 102 around the entire periphery of the permeable media layer 108. Additionally, at a choke 114 of the system 100, the non-permeable bladder 110 is movable into and out of direct contact with the release film layer 106 via movement into and out of the gap 116 formed in the permeable media layer 108.

In one implementation, the non-permeable bladder 110 is flexible and conforms to the shape of the permeable media layer 108 and any other structure it directly overlays. The non-permeable bladder 110 has a permeability low enough to prevent gasses (e.g., air) and liquid resin from permeating through the non-permeable bladder 110, whether in thickness or plane. Accordingly, the permeability of the non-permeable bladder 110 lower than the permeability of the sheet 104, the release film layer 106, and the permeable media layer 108. In one implementation, the non-permeable bladder 110 is a stretchable vacuum bag film made of a durable polymeric material or fabric, such as nylon or a thermoplastic elastomer. In one implementation, the non-permeable bladder 110 can be made of WL7400™ or SL800™ made by Airtech International Inc. of Huntington Beach, Calif.

The non-permeable bladder 110 is sealed to the portion of the tool 102 around the entire periphery of the permeable media layer 108. In this manner, the sheet 104, the release film layer 106, and the permeable media layer 108 are sealed between the non-permeable bladder 110 and the tool 102. Due to the low permeability of the non-permeable bladder 110, the seal between the non-permeable bladder 110 and the tool 102 is a hermetic or airtight seal. Such a seal is created between the non-permeable bladder 110 and the tool 102 in any of various ways. According to one example, the outer periphery of the non-permeable bladder 110 is adhered to the portion of the tool 102 via a sealing member 112. The sealing member 112 can be an adhesive, such as adhesive tape, sealant tape, a bean of adhesive, or the like, affixed to the tool 102 and to which the non-permeable bladder 110 is affixed. In other examples, the seal between the non-permeable bladder 110 and the tool 102 is facilitated by another type of seal, such as a gasket or O-ring, fastened or adhered to one of or both the tool 102 and the non-permeable bladder 110.

The system 100 also includes an inlet 126 and an outlet 127. The inlet 126 is located adjacent a first side 131 of the sheet 104 and the outlet 127 is located adjacent a second side 133 of the sheet 104, opposite the first side 131. In other words, the inlet 126 is spaced apart from the outlet 127 by at least the width or length of the sheet 104. The inlet 126 is open to the permeable media layer 108 at a location adjacent the first side 131 of the sheet 104 and the outlet 127 is open to the permeable media layer 108 at a location adjacent the second side 133 of the sheet 104. Additionally, the outlet 127 is open to the permeable media layer 108 at such a location that the gap 116 is between the second side 133 of the sheet 104 and the location.

The inlet 126 and the outlet 127 can have any of various configurations that allow the inlet 126 and the outlet 127 to be open to the permeable media layer 108. According to one example, as shown, the inlet 126 and the outlet 127 are formed in the tool 102. In other words, the inlet 126 and the outlet 127 can be respective conduits formed in and/or through the tool 102. Alternatively, although not shown, the inlet 126 and the outlet 127 can be formed in the non-permeable bladder 110.

The system 100 further includes a permeability control valve 115 that is selectively operable to adjust the permeability of the permeable media layer 108. Generally, the permeability control valve 115 selectively adjusts the permeability of the permeable media layer 108 by effectively plugging the gap 116 with the non-permeable bladder 110 to decrease the permeability of the permeable media layer 108 and unplugging the gap 116, by allowing the non-permeable bladder 110 to move out of the gap 116, to increase the permeability of the permeable media layer 108. The permeability control valve 115 is integrally formed with the choke 114 to effectively open (e.g., deactivate) and close (e.g., activate) the choke 114. Accordingly, the permeability control valve 115 is located proximate the gap 116 formed in the permeable media layer 108.

The permeability control valve 115 includes a rigid cap 120 sealed (e.g., hermetically sealed) to an exterior surface of the non-permeable bladder 110 at a location over the gap 116. In other words, the rigid cap 120 spans the gap 116 such that a portion of the non-permeable bladder 110 is interposed between the rigid cap 120 and the gap 116. The rigid cap 120 helps define an interior cavity 121 between the rigid cap 120 and the exterior surface of the non-permeable bladder 110. The volume of the interior cavity 121 fluctuates as the permeability control valve 115 selectively adjusts the permeability of the permeable media layer 108. The rigid cap 120 extends lengthwise along an entire length of the gap 116 and has any of various cross-sectional shapes along a plane perpendicular to the length of the gap 116. In the illustrated example, the rigid cap 120 has a semi-circular shaped cross-section. However, in other examples, the rigid cap 120 may have any of various non-semi-circular cross-sectional shapes, such as semi-ovular, semi-square, V-shaped, and the like. The rigid cap 120 can be sealed to the exterior surface of the non-permeable bladder 110 using any of various sealing techniques, such as adhering, welding, bonding, fastening, and the like. The rigid cap 120 is made from any of various materials, such as metal, hardened plastics, fiber-reinforced plastics, and the like, sufficiently rigid to withstand, without deformation, a pressure differential at least equal to atmospheric pressure.

The permeability control valve 115 further includes a vacuum 136 fluidly coupleable with the interior cavity 121 of the rigid cap 120. In one example, the rigid cap 120 includes an aperture 135 through which air is passable into and out of the interior cavity 121. The aperture 135 is fluidly coupled to the vacuum 136, such as via a fluid conduit 138. In this manner, the vacuum 136 is selectively operable to adjust the pressure P1 in the interior cavity 121 of the rigid cap 120. For example, the vacuum 136 is selectively operable to reduce the pressure P1 in the interior cavity 121 to below atmospheric pressure.

The permeability control valve 115 additionally includes a vent 142 (e.g., valve) selectively operable to fluidly couple the interior cavity 121 of the rigid cap 120 to the atmosphere. In the illustrated example, the vent 142 is fluidly coupleable with the interior cavity 121 via the fluid conduit 138. However, in other examples, the vent 142 is operably coupled to the vacuum 136. When opened, the vent 142 is configured to vent the interior cavity 121 to the atmosphere such that the pressure P1 in the interior cavity 121 is at atmospheric pressure. When closed, the vent 142 seals the interior cavity 121 from the atmosphere such that the vacuum 136 can reduce the pressure P1 to below atmospheric pressure.

The system 100 further includes a resin source 122 configured to contain liquid resin. In some examples, the resin source 122 is an enclosed container, such as a pressurized vessel, containing a liquid resin. The liquid resin can be any of various thermoset plastic materials storable in a liquid or flowable form below a cure temperature of the thermoset plastic materials. At or above the cure temperature, the thermoset plastic material of the liquid resin is configured to undergo a non-reversible molecular change and harden. In some examples, the liquid resin can be any of various types of epoxy resins known in the art. The resin source 122 is fluidly coupleable with the inlet 126, such as via a fluid conduit 124 fluidly coupled to the resin source 122 at one end and the inlet 126 at an opposite end.

Also fluidly coupled to the resin source 122 is a vacuum 128. The vacuum 128 can be fluidly coupled to the resin source 122 via a fluid conduit 130 fluidly coupled to the vacuum 128 at one end and the resin source 122 at an opposite end. Furthermore, the vacuum 128 is selectively operable to adjust the pressure P2 of the resin source 122. Generally, the pressure P2 of the resin source 122 is the pressure applied to the liquid resin within the resin source 122. According to some examples, the system 100 further includes a flow regulation valve 150 configured to control a flow rate of liquid resin from the resin source 122 to the inlet 126. In one implementation, the flow regulation valve 150 functions as an on/off valve that alternates between a fully open position, to allow flow of liquid resin to the inlet 126, and a fully closed position, to prevent flow of liquid resin to the inlet 126.

The system 100 further includes a vacuum 132 fluidly coupleable to the outlet 127 via a fluid conduit 134 fluidly coupled to the vacuum 132 at one end and the outlet 127 at an opposite end. The vacuum 132 is selectively operable to adjust the pressure P3 at the outlet 127.

Figure 2:
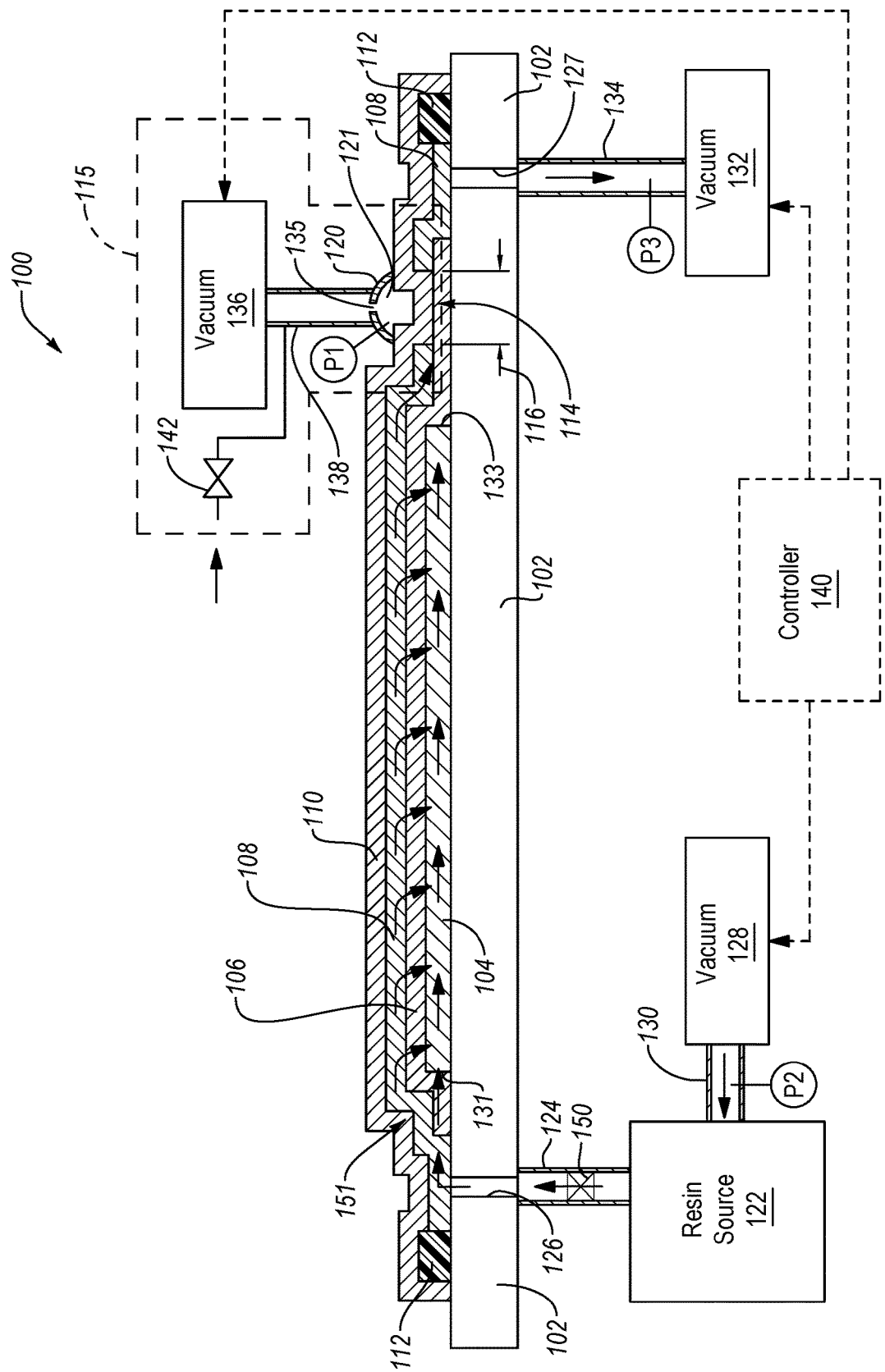
FIG. 2 is an illustration of the system of FIG. 1, in a second mode, according to one or more examples of the present disclosure.

The system 100 is operable in a first mode (e.g., evacuation mode) and a second mode (e.g., resin infusion mode). The first mode is depicted in FIG. 1 and the second mode is depicted in FIG. 2. Generally, the system 100 is operated in the first mode before being operated in the second mode.

Referring to FIG. 1, in the first mode, the vent 142 is closed and the vacuum 136 is operated to achieve a first pressure P1 within the interior cavity 121 of the rigid cap 120 that is lower than atmospheric pressure, as represented by a directional arrow away from the rigid cap 120. In a first example, the first pressure P1 is approximately zero millibar. As defined herein, approximately zero millibar can mean exactly zero millibar or within 3-5 millibars of zero millibar, as it is often difficult to achieve an exactly zero millibar environment. Also, in the first mode, the vacuum 128 is operable to achieve a second pressure P2, acting on the liquid resin in the resin source 122, that is lower than atmospheric pressure and equal to the third pressure P3, as represented by a directional arrow away from the resin source 122. In the first example, the second pressure P2 is approximately zero millibar. Further, in the first mode, the vacuum 132 is operable to achieve a third pressure P3, at the outlet 127, that is lower than atmospheric pressure and equal to or more than the first pressure P1, as represented by a directional arrow away from the outlet 127. In the first example, the third pressure P3 is approximately zero millibar.

With the second pressure P2 equal to the third pressure P3, the pressure differential, across a stack 151 comprising the sheet 104, the release film layer 106, and the permeable media layer 108, between the resin source 122 and the outlet 127 is zero. Accordingly, there is no pressure differential to urge liquid resin in the resin source 122 through the inlet 126 and across the stack 151 towards the inlet 126. However, as indicated by directional arrows, the pressure differential between atmospheric pressure, external to the system, and the third pressure P3 causes gaseous volatiles in the sheet 104 to evacuate the sheet 104 and flow to the outlet 127. Due to the higher permeability of the permeable media layer 108 relative to the sheet 104, as further shown by directional arrows, the permeable media layer 108 provides a low-resistance flow path in which gaseous volatiles from the sheet 104 can more efficiently flow out of the stack 151 to the outlet 127.

With the first pressure P1 within the interior cavity 121 of the rigid cap 120 lower than atmospheric pressure and less than or equal to the third pressure P3 at the outlet 127, there is no pressure differential acting on the valve portion of the non-permeable bladder 110 over the gap 116 to urge the valve portion of the non-permeable bladder 110 into the gap 116 to effectively close the choke 114. Rather, where the first pressure P1 is equal to the third pressure P3, the zero pressure differential between acting on the valve portion of the non-permeable bladder 110 allows the valve portion of the non-permeable bladder 110 to be moved out of the gap 116 by the gaseous volatiles being evacuated through the permeable media layer 108 to effectively open the choke 114 (e.g., unplug the gap 116). Or alternatively, where the third pressure P3 is greater than the first pressure P1, this pressure differential acting on the valve portion of the non-permeable bladder 110 urges the valve portion of the non-permeable bladder 110 out of the gap 116 to open the choke 114. Accordingly, unlike conventional systems that non-adjustably choke flow during evacuation of gaseous volatiles, the permeability control valve 115 deactivates the choke 114 during the evacuation of gaseous volatiles to promote the efficient and complete evacuation of such gaseous volatiles from the sheet 104.

Referring to FIG. 2, in the second mode, the vent 142 is open such that the first pressure P1 within the interior cavity 121 of the rigid cap 120 is equal to atmospheric pressure, as represented by a directional arrow toward the rigid cap 120. Also, in the second mode, the vacuum 128 is operable to achieve a second pressure P2, acting on the liquid resin in the resin source 122, that is lower than atmospheric pressure, but higher than the third pressure P3, as represented by a directional arrow away from the resin source 122. In the first example, the second pressure P2 is between about 500 millibar and about 800 millibar. Further, in the second mode, the vacuum 132 is operable to achieve a third pressure P3, at the outlet 127, that is lower than the first pressure P1 and lower than the second pressure P2, as represented by a directional arrow away from the outlet 127. In the first example, the third pressure P3 is approximately zero millibar.

With the second pressure P2 greater than the third pressure P3, the pressure differential, across the stack 151 between the resin source 122 and the outlet 127 is greater than zero. After the flow regulation valve 150 is opened, such a non-zero pressure differential urges liquid resin in the resin source 122 through the inlet 126 and across the stack 151 towards the inlet 126. Due to the higher permeability of the permeable media layer 108 relative to the sheet 104, as further shown by directional arrows, the permeable media layer 108 provides a low-resistance flow path in which the liquid resin can flow to promote complete and uniform distribution and infusion into the sheet 104.

With the first pressure P1 within the interior cavity 121 of the rigid cap 120 equal to atmospheric pressure and thus more than the third pressure P3 at the outlet 127, a pressure differential acts on the valve portion of the non-permeable bladder 110 over the gap 116 to urge the valve portion of the non-permeable bladder 110 into the gap 116 against the release film layer 106 to effectively close the choke 114 (e.g., plug the gap 116). Because the liquid resin does not permeate through the non-permeable bladder 110, the valve portion of the non-permeable bladder 110, being in the gap 116, impedes the flow of the liquid resin across the gap 116. Instead, the liquid resin is forced to flow into the release film layer 106, which, having a lower permeability than the permeable media layer 108, restricts the flow of liquid resin. The restriction of flow of liquid resin induced by the closing of the permeability control valve 115 and corresponding activation of the choke 114 allows the liquid resin flowing into the stack 151 behind the choke 114 to more uniformly and completely infuse into the sheet 104. Accordingly, the permeability control valve 115 is operable to promote both the efficient and complete evacuation of gaseous volatiles from the sheet 104 and efficient and complete infusion of liquid resin into the sheet 104.

Figure 3:
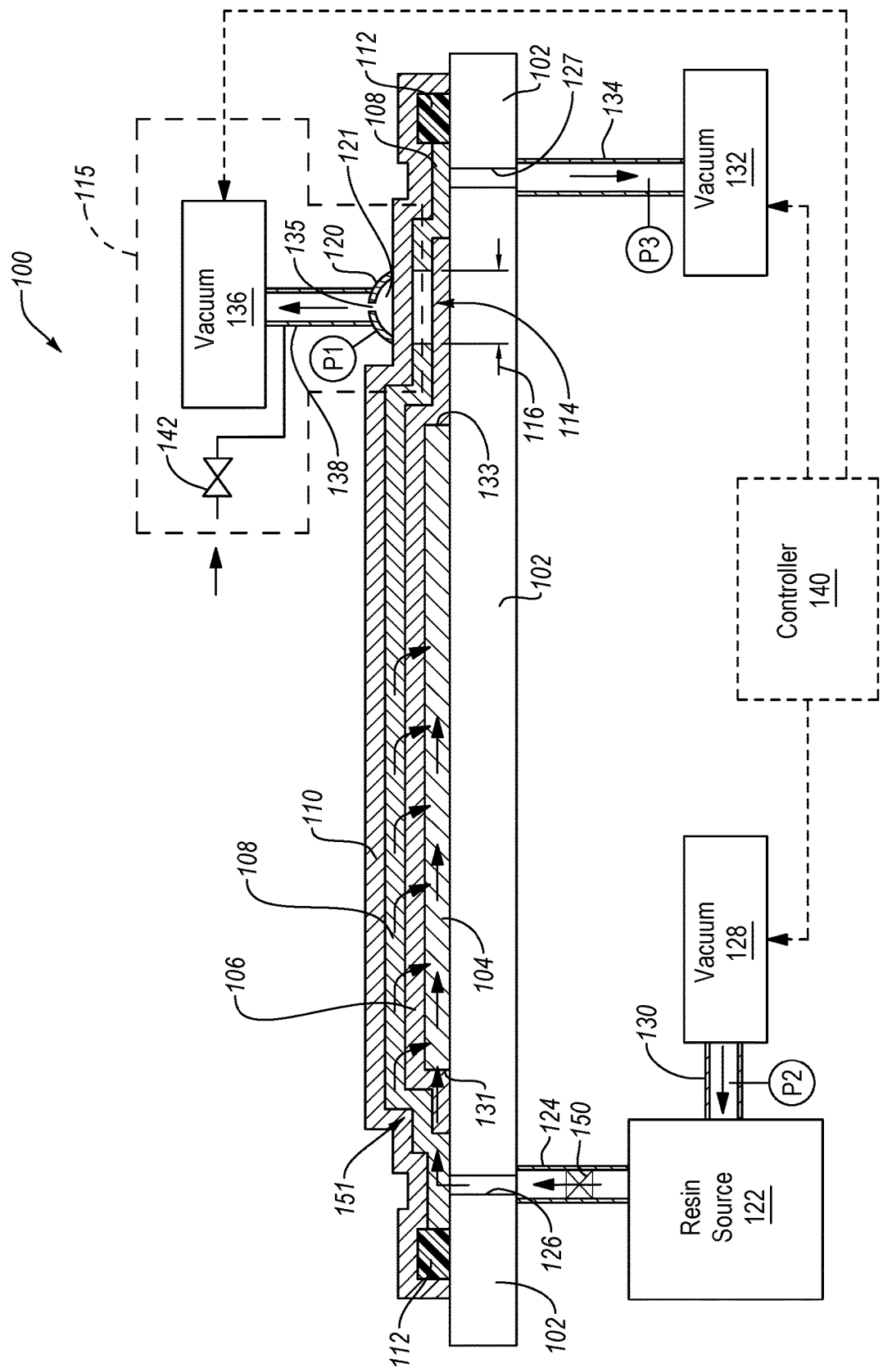
FIG. 3 is an illustration of the system of FIG. 1, in a third mode, according to one or more examples of the present disclosure.

In some embodiments, the system 100 is also operable in a third mode (e.g., a first stage resin infusion mode) that is executed after the first mode and before the second mode, which operates as a second stage resin infusion mode in such embodiments. The third mode is depicted in FIG. 3.

The third mode is similar to the second mode. For example, in the third mode, the vacuum 128 is operable to achieve a second pressure P2 lower than atmospheric pressure, but higher than the third pressure P3, the vacuum 132 is operable to achieve a third pressure P3, at the outlet 127, that is lower than the second pressure P2. However, unlike the second mode, the permeability control valve 115 is opened in the third mode to effectively deactivate the choke 114, in a manner similar to that described in association with the first mode. Accordingly, in the third mode, the liquid resin flows along the permeable media layer 108 and infuses into the sheet 104 while the choke 114 is open. Because the permeability of the permeable media layer 108 is higher while the choke 114 is open, further evacuation of gaseous volatiles from the sheet 104 can occur while the liquid resin flows through the permeable media layer 108 and is infused into the sheet 104. However, to prevent liquid resin from reaching the outlet 127 before the sheet 104 is completely infused with the liquid resin, the system 100 initiates the second mode, by closing the permeability control valve 115 and activating the choke 114, before the liquid resin reaches the choke 114. In some implementations, the system 100 switches from the third mode to the second mode after a predetermined period of time from the start of operation in the third mode. The predetermined period of time can be determined empirically or through flow modeling techniques. Alternatively, in other implementations, the system 100 switches from the third mode to the second mode based input from one or more sensors of the system 100. The sensors may be configured to detect or provide data for detecting various characteristics of the liquid resin in the stack 151, such as the leading edge of the flow of liquid resin in the stack 151 or the level of infusion of liquid resin in the sheet 104.

Although not shown, the system 100 may include or form part of a curing apparatus, such as an oven, configured to cure the liquid resin infused in the sheet 104 after the second mode is complete. In some implementations, the sheet 104 is cured while in situ in the stack 151.

According to some embodiments, the execution (e.g., timing and implementation) of the first mode, the second mode, and/or the third mode is performed manually. For example, each of the vacuums and valves of the system 100 can be operated manually to switch between the modes of the system 100. However, in other embodiments, the system 100 includes a controller 140 configured to automatically control the execution of the modes of the system 100 and automatically switch operation of the system 100 between the first mode, the second mode, and the third mode. For example, the controller 140 can be operably coupled with the vacuum 128, the vacuum 132, the vacuum 136, the vent 142, and the flow regulation valve 150 to independently control operation of these components to effectuate the modes of the system 100 in an automated manner.

In the system 100 of FIGS. 1-3, the permeability control valve 115 is located adjacent the outlet 127, and between the inlet 126 and the outlet 127. In other words, the permeability control valve 115 is between the inlet 126 and the outlet 127 at a location closer to the outlet 127 than the inlet 126. In this manner, the permeability control valve 115 does not directly affect the ability of liquid resin to flow into the stack 151 from the resin source 122. Instead, the system 100 of FIGS. 1-3 includes the flow regulation valve 150 to directly affect the ability of liquid resin to flow into the stack 151 by blocking and unblocking the fluid conduit 138 and/or the inlet 126. Because the flow regulation valve 150 is in-line with the flow of liquid resin, the liquid resin comes in contact with and coats portions of the flow regulation valve 150 during the second and third modes of the system 100. After infusing and curing a sheet 104 with liquid resin using the system 100 of FIGS. 1-3 and before infusing liquid resin into a new sheet 104 using the system 100, the flow regulation valve 150 is either cleaned and reused or replaced with a new flow regulation valve 150.

Figure 4:
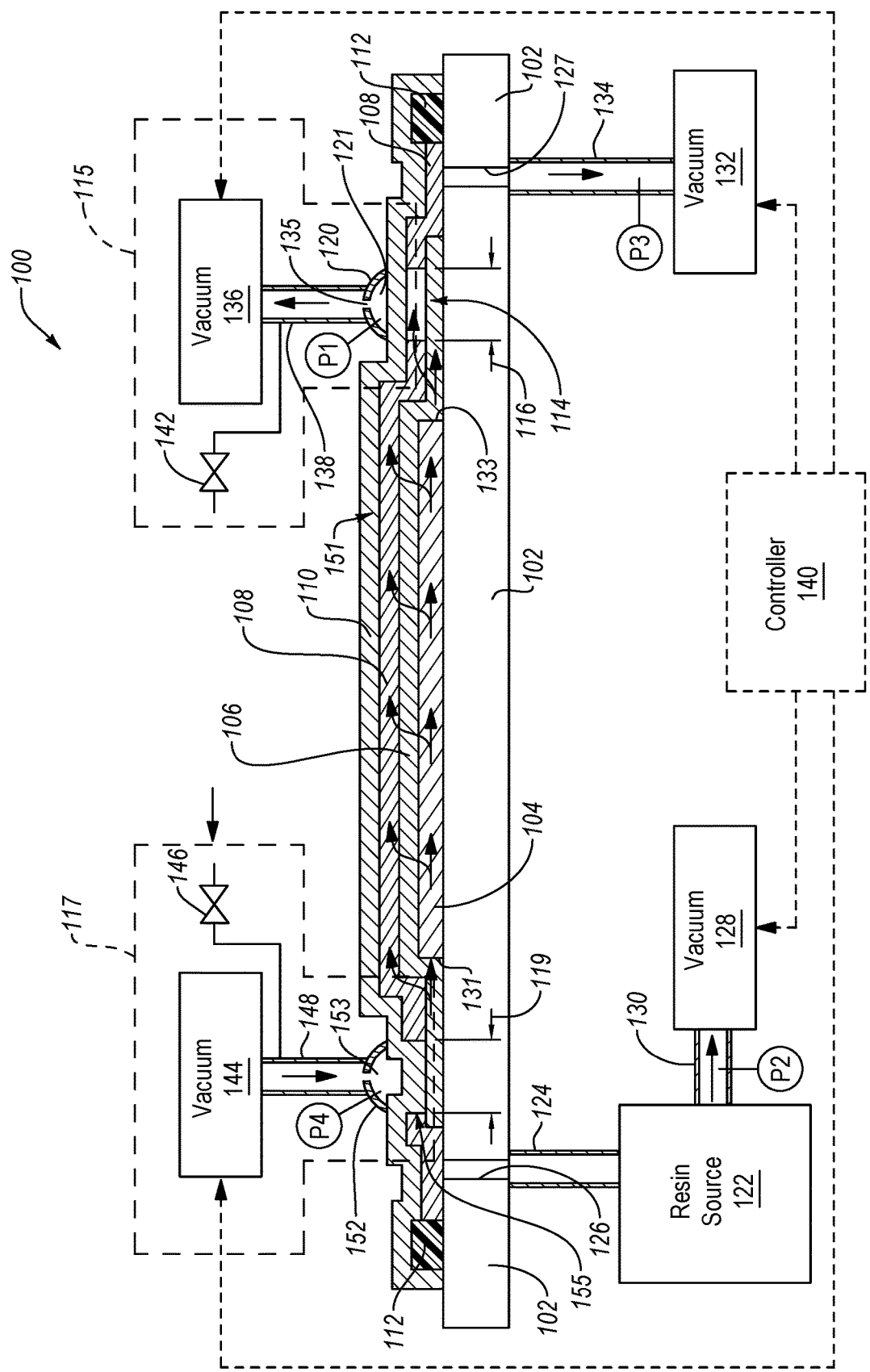
FIG. 4 is a schematic illustration of another system for infusing liquid resin into a sheet of fibrous material, in a first mode, according to one or more examples of the present disclosure.
Figure 5:
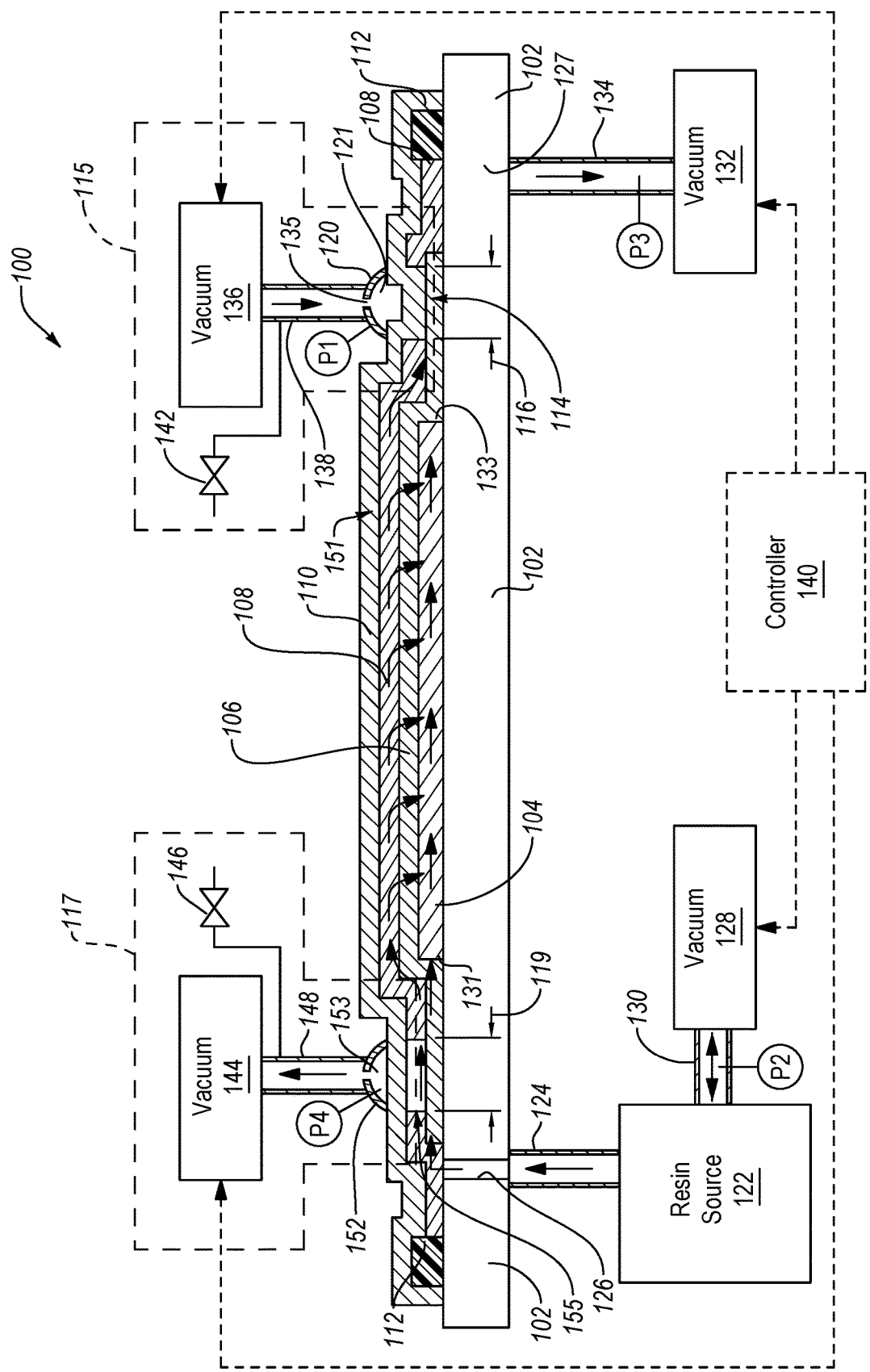
FIG. 5 is an illustration of the system of FIG. 4, in a second mode, according to one or more examples of the present disclosure.
Figure 6:
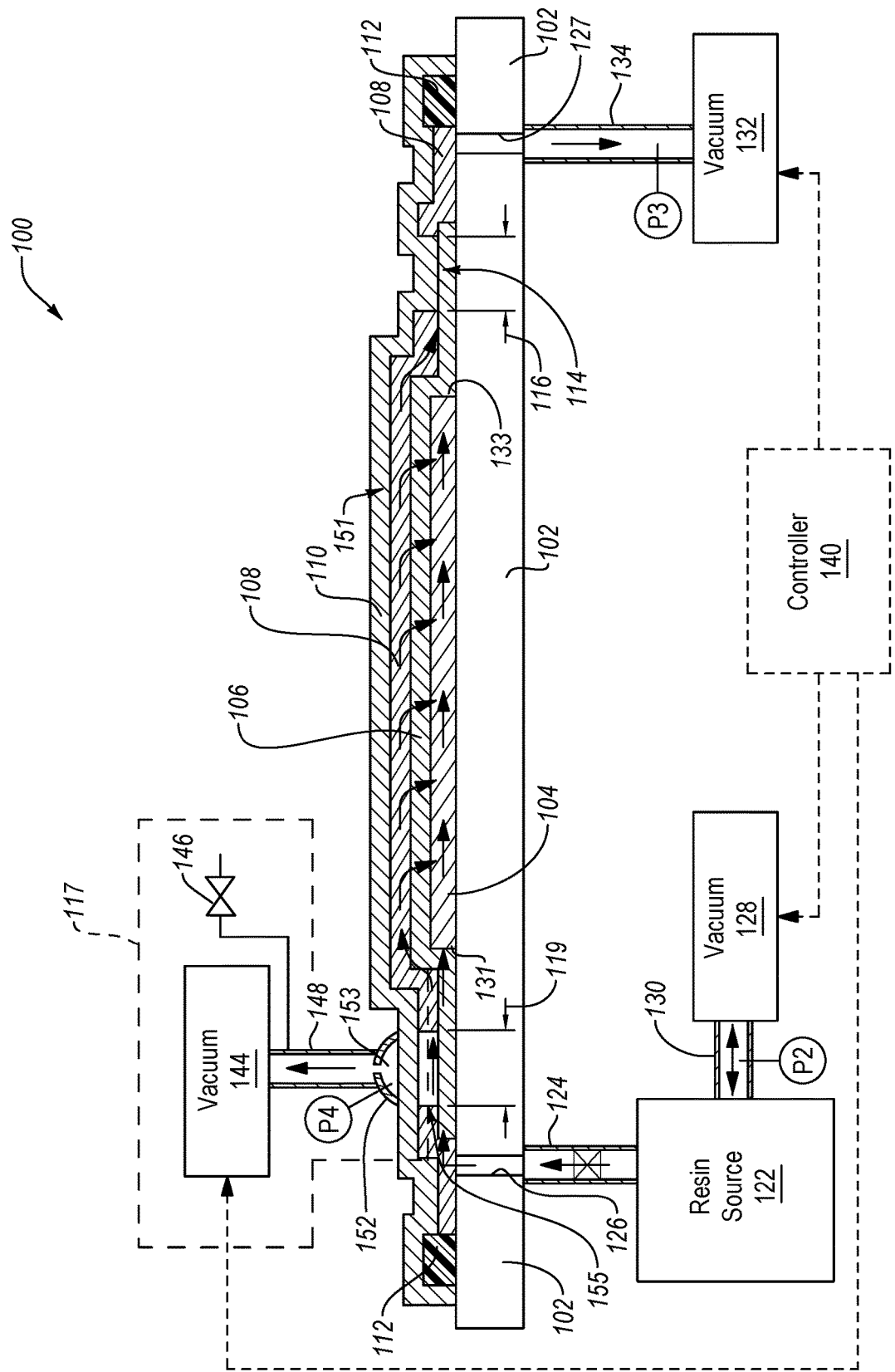
FIG. 6 is a schematic illustration of yet another system for infusing liquid resin into a sheet of fibrous material, according to one or more examples of the present disclosure.
Figure 7:
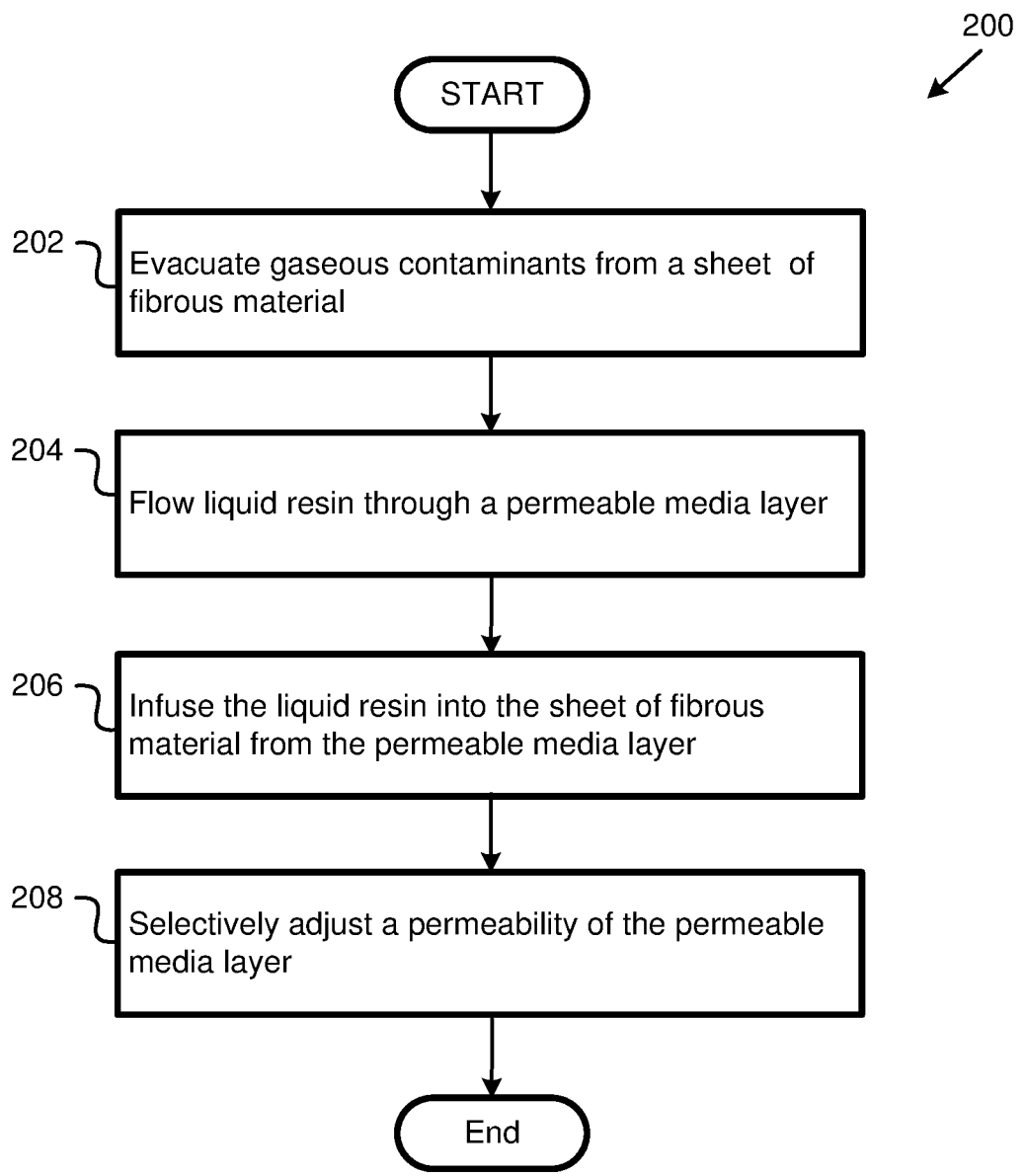
FIG. 7 is a schematic flow diagram of a method of infusing liquid resin into a sheet of fibrous material, according to one or more examples of the present disclosure.

To avoid cleaning or replacement of a flow regulation valve following each resin infusion process, in some embodiments, the system 100 of FIGS. 4-6 does not include a flow regulation valve 150, but instead utilizes a permeability control valve 117 located adjacent the outlet 127, and between the inlet 126 and the outlet 127, to directly affect the ability of liquid resin to flow into the stack 151. In other words, the permeability control valve 117 of the system 100 of FIGS. 4-6 effectively replaces the flow regulation valve 150 of the system 100 of FIGS. 1-3.

Referring to FIG. 4, the permeability control valve 117 is similar to the permeability control valve 115. For example, the permeability control valve 117 is selectively operable to adjust the permeability of the permeable media layer 108. Generally, the permeability control valve 117 selectively adjusts the permeability of the permeable media layer 108 by effectively plugging a gap 119, similar to the gap 116, with the non-permeable bladder 110 to decrease the permeability of the permeable media layer 108 and unplugging the gap 119, by allowing the non-permeable bladder 110 to move out of the gap 119, to increase the permeability of the permeable media layer 108. The permeability control valve 117 is integrally formed with a choke 155, similar to the choke 114, to effectively open (e.g., deactivate) and close (e.g., activate) the choke 155. Accordingly, the permeability control valve 117 is located proximate the gap 119 formed in the permeable media layer 108. The inlet 126 is open to the permeable media layer 108 at such a location that the gap 119 is between the first side 131 of the sheet 104 and the location.

The permeability control valve 117 includes a rigid cap 152 sealed (e.g., hermetically sealed) to an exterior surface of the non-permeable bladder 110 at a location over the gap 119. In other words, the rigid cap 152 spans the gap 119 such that a portion of the non-permeable bladder 110 is interposed between the rigid cap 152 and the gap 119. The rigid cap 152 helps define an interior cavity 153 between the rigid cap 152 and the exterior surface of the non-permeable bladder 110. As with the permeability control valve 115, the volume of the interior cavity 153 fluctuates as the permeability control valve 117 selectively adjusts the permeability of the permeable media layer 108. As with the rigid cap 120, the rigid cap 152 extends lengthwise along an entire length of the gap 119 and has any of various cross-sectional shapes along a plane perpendicular to the length of the gap 119. Also like the rigid cap 120, the rigid cap 152 can be sealed to the exterior surface of the non-permeable bladder 110 using any of various sealing techniques and can be made from any of various sufficiently-rigid materials.

The permeability control valve 117 further includes a vacuum 144 fluidly coupleable with the interior cavity 153 of the rigid cap 152. The vacuum 144 is selectively operable to adjust the pressure P4 in the interior cavity 153 of the rigid cap 152. For example, the vacuum 144 is selectively operable to reduce the pressure P4 in the interior cavity 153 to below atmospheric pressure. The permeability control valve 117 additionally includes a vent 146, like the vent 142, selectively operable to fluidly couple the interior cavity 153 of the rigid cap 152 to the atmosphere.

The permeability control valve 117 is selectively operable to close the choke 155 to prevent or restrict liquid resin flow through the inlet 126 into the stack 151, such as while the sheet 104 is evacuated during the first mode. Referring to FIG. 4, in the first mode of the system 100, the vent 146 is open to achieve a fourth pressure P4 within the interior cavity 153 of the rigid cap 152 equal to atmospheric pressure, as represented by a directional arrow toward the rigid cap 152. With the fourth pressure P4 within the interior cavity 153 of the rigid cap 152 equal to atmospheric pressure and thus more than the second pressure P2 at the inlet 126, a pressure differential acts on the valve portion of the non-permeable bladder 110 over the gap 119 to urge the valve portion of the non-permeable bladder 110 into the gap 119 against the release film layer 106 to effectively close the choke 155 (e.g., plug the gap 119). Because the liquid resin does not permeate through the non-permeable bladder 110, the valve portion of the non-permeable bladder 110, being in the gap 119, effectively blocks the flow of liquid resin through the permeable media layer 108 at the gap 119 by preventing the liquid resin from flowing across the gap 119 and rejoining the permeable media layer 108.

The permeability control valve 117 is selectively operable to open the choke 155 to allow liquid resin to flow through the inlet 126 into the stack 151 and infuse into the sheet 104 during the second mode or the third mode. Referring to FIG. 5, in the second mode or third mode, the vent 146 is closed and the vacuum 144 is operated to achieve a fourth pressure P4 within the interior cavity 153 of the rigid cap 152 that is lower than atmospheric pressure, as represented by a directional arrow away from the rigid cap 152. In a first example, the fourth pressure P4 is approximately zero millibar. With the fourth pressure P4 within the interior cavity 153 of the rigid cap 152 lower than atmospheric pressure and less than the second pressure P2 at the inlet 126, this pressure differential acting on the valve portion of the non-permeable bladder 110 urges the valve portion of the non-permeable bladder 110 out of the gap 119 to open the choke 155 and allow the flow of liquid resin through the permeable media layer 108 at the gap 119. In this manner, the permeability control valve 117 acts as a flow regulation valve to allow or prevent the flow of liquid resin into the stack 151 depending on the operational mode of the system 100.

As shown in FIG. 6, in some embodiments, the system 100 includes the permeability control valve 117, but does not include the permeability control valve 115. Instead, the system 100 shown in FIG. 6 includes a choke 114 at the outlet 127 that is non-adjustably activated or closed, and thus does not operate in the first or third modes of operation. Accordingly, the benefits of the permeability control valve 117 are utilized in the system 100 of FIG. 6 only for allowing or preventing the flow of liquid resin into the stack 151 during the second mode of the system 100.

Referring to FIGS. 1-7, according to one embodiment, a method 200 of infusing liquid resin into a sheet 104 of fibrous material includes evacuating gaseous contaminants from the sheet 104 of fibrous material through a permeable media layer 108 at 202. The sheet 104 of fibrous material and the permeable media layer 108 are covered by a non-permeable bladder 110 that is sealed to a tool 102 about the sheet 104 of fibrous material. The method 200 also includes flowing liquid resin from an inlet 126 through a permeable media layer 108 interposed between the sheet 104 of fibrous material and the non-permeable bladder 110 at 204. The method 200 further includes infusing the liquid resin into the sheet 104 of fibrous material from the permeable media layer 108 at 206. The method 200 additionally includes selectively adjusting a permeability of the permeable media layer 108 such that the permeability of the permeable media layer 108 while evacuating the gaseous contaminants is higher than while flowing and infusing the liquid resin at 208. In some implementations, the system 100 is used to manually and/or automatically perform the steps of the method 200, as described above.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the controller 140 of the system 100 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The controller 140 may be implemented as a hardware circuit comprising custom VLSI circuits or gate arrays, off-the-shelf semiconductors such as logic chips, transistors, or other discrete components. The controller 140 may also be implemented in programmable hardware devices such as field programmable gate arrays, programmable array logic, programmable logic devices or the like.

In certain implementations, the controller 140 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the controller 140. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of infusing liquid resin into a sheet of fibrous material, the method comprising steps of:
   evacuating gaseous contaminants from the sheet of fibrous material through a permeable media layer to an outlet, and wherein the sheet of fibrous material is covered by a non-permeable bladder that seals the sheet of fibrous material to a tool;
   flowing liquid resin from an inlet through the permeable media layer, wherein the permeable media layer comprises a solid permeable structure that extends between the sheet of fibrous material and the non-permeable bladder;
   infusing the liquid resin into the sheet of fibrous material from the permeable media layer; and
   selectively adjusting distance between the non-permeable bladder and the fibrous material at a gap formed in the permeable media layer such that a first resistance to fluid flow through the permeable media layer during the step of evacuating the gaseous contaminants from the sheet of fibrous material through the permeable media layer is lower than a second resistance to fluid flow through the permeable media layer during the step of flowing the liquid resin from the inlet through the permeable media layer and during the step of infusing the liquid resin into the sheet of fibrous material from the permeable media layer.

2. The method according to claim 1, wherein the gaseous contaminants are evacuated from the sheet of fibrous material before the liquid resin is flowed from the inlet through the permeable media layer.

3. The method according to claim 1, wherein a portion of the liquid resin is flowed from the inlet through the permeable media layer and infused into the sheet of fibrous material from the permeable media layer while a portion of the gaseous contaminants are evacuated from the sheet of fibrous material.

4. The method according to claim 1, wherein the step of selectively adjusting the distance between the non-permeable bladder and the fibrous material at the gap formed in the permeable media layer comprises selectively unplugging and plugging the gap, formed in the permeable media layer.

5. The method according to claim 1, wherein the step of selectively adjusting the distance between the non-permeable bladder and the fibrous material at the gap formed in the permeable media layer comprises selectively operating a vacuum device.

6. The method according to claim 1, wherein the step of selectively adjusting the distance between the non-permeable bladder and the fibrous material at the gap formed in permeability of the permeable media layer comprises selectively operating a first vacuum device, coupled to the inlet, and selectively operating a second vacuum device, coupled to the outlet.

7. The method according to claim 1, wherein the step of selectively adjusting the distance between non-permeable bladder and the fibrous material at the gap formed in the permeable media layer comprises steps of:
deflecting the non-permeable bladder into the gap, formed in the permeable media layer, to increase resistance to fluid flow through the permeable media layer by controlling a permeability control valve; and
urging the non-permeable bladder out of the gap, formed in the permeable media layer to reduce resistance to fluid flow through the permeable media layer, by controlling the permeability control valve.

8. The method according to claim 7, wherein:
the step of deflecting the non-permeable bladder into the gap comprises venting an interior cavity of a rigid cap of the permeability control valve, sealed to the non-permeable bladder over the gap, to atmosphere while a third pressure (P3) at the outlet is less than atmospheric pressure; and
the step of urging the non-permeable bladder out of the gap comprises reducing a first pressure (P1) in the interior cavity of the rigid cap of the permeability control valve to less than atmospheric pressure while the third pressure (P3) at the outlet is more than or equal to the first pressure (P1).

9. The method according to claim 8, wherein:
the third pressure (P3) is approximately zero millibar; and
the first pressure (P1) is approximately zero millibar.

10. The method according to claim 1, wherein:
the step of flowing the liquid resin from the inlet through the permeable media layer comprises selectively increasing the distance between the non-permeable bladder and the fibrous material at the gap formed in the permeable media layer while the liquid resin in a resin source is at a second pressure (P2), and a third pressure (P3) at the outlet is less than the second pressure (P2); and
the resin source is fluidly coupled to the inlet.

11. The method according to claim 10, wherein:
the second pressure (P2) is between about 500 millibar and about 800 millibar; and
the third pressure (P3) is approximately zero millibar.

12. The method according to claim 10, wherein the step of selectively increasing distance between the non-permeable bladder at the fibrous material at the gap formed in the permeable media layer comprises controlling a permeability control valve to urge the non-permeable bladder out of the gap formed in the permeable media layer.

13. The method according to claim 1, wherein the step of flowing the liquid resin from the inlet through the permeable media layer further comprises opening a flow regulation valve between the inlet and a resin source.

14. The method according to claim 13, further comprising closing the flow regulation valve to prevent the liquid resin from flowing out of the inlet through the permeable media layer, while evacuating the gaseous contaminants from the sheet of fibrous material.

15. The method according to claim 1, wherein:
the step of selectively adjusting the distance between the non-permeable bladder and the fibrous material at the gap formed in the permeable media layer comprises a step of opening a first permeability control valve, located between the inlet and the outlet;
the step of flowing the liquid resin from the inlet through the permeable media layer further comprises a step of opening a second permeability control valve, located between the inlet and the outlet; and
the first permeability control valve is closer to the outlet than the second permeability control valve.

16. The method according to claim 15, wherein:
the first permeability control valve is opened when the second permeability control valve is closed; and
the second permeability control valve is opened when the first permeability control valve is closed.

17. The method according to claim 15, wherein the first permeability control valve is opened when the second permeability control valve is opened.

18. The method according to claim 15, wherein:
the step of opening the first permeability control valve comprises urging the non-permeable bladder out of a first gap, formed in the permeable media layer, to reduce resistance to fluid flow through the permeable media layer;
the step of opening the second permeability control valve comprises urging the non-permeable bladder out of a second gap, formed in the permeable media layer, to reduce resistance to fluid flow through the permeable media layer; and
the first gap is spaced from the second gap.

19. The method according to claim 1, further comprising flowing the liquid resin from the permeable media layer through a release film layer, interposed between the sheet of fibrous material and the permeable media layer, and wherein the liquid resin is infused into the sheet of fibrous material from the release film layer.

20. The method according to claim 19, wherein the release film layer is less permeable than the permeable media layer.

* * * * *